United States Patent

Pattakos et al.

[11] Patent Number: 6,062,187
[45] Date of Patent: May 16, 2000

[54] PULLING PISTON ENGINE

[76] Inventors: Manousos Pattakos; John Pattakos; Emmanouel Pattakos, all of Lampraki 356, PC 18452 Gr Nikea Piraeus, Greece

[21] Appl. No.: 09/230,192
[22] PCT Filed: Jul. 22, 1997
[86] PCT No.: PCT/GR97/00031
§ 371 Date: Jan. 19, 1999
§ 102(e) Date: Jan. 19, 1999
[87] PCT Pub. No.: WO98/03780
PCT Pub. Date: Jan. 29, 1998

[30] Foreign Application Priority Data

Jul. 23, 1996 [GR] Greece ................................ 960100259

[51] Int. Cl.[7] .................................................. F02B 75/32
[52] U.S. Cl. ........................... 123/197.1; 123/197.4
[58] Field of Search ............................. 123/197.1, 197.2, 123/197.4

[56] References Cited

U.S. PATENT DOCUMENTS

| | | | |
|---|---|---|---|
| 2,127,384 | 8/1938 | Anthony | 123/197.1 |
| 3,916,866 | 11/1975 | Rossi | 123/197.1 |
| 5,167,208 | 12/1992 | Rasiah | 123/197.4 |
| 5,243,938 | 9/1993 | Yan | 123/197.1 |

FOREIGN PATENT DOCUMENTS

| | | |
|---|---|---|
| 25 15 641 | 10/1976 | Germany . |
| 33 27 225 | 2/1994 | Germany . |
| WO 94/03715 | 2/1994 | WIPO . |

Primary Examiner—John Kwon

[57] ABSTRACT

An internal combustion engine is arranged with a piston-rod which is kept at a minimum thickness because it is secured on a pin which comprises slider means, sliding on slideways secured to the casing. As a result, the compactness of the combustion chamber, defined between the piston and the crankcase, as well as the valve area are both kept at a maximum, whether these valves are the intake and exhaust valves of a 4-stroke or the exhaust valves of a 2-stroke engine. Directly driven camshafts, inside the crankcase, provide a valve gear train of a minimum inertia and constitute available counterweight shafts in the case of a 2-cycle engine for balancing first order forces and first order moments.

3 Claims, 5 Drawing Sheets

PULLING PISTON ENGINE

BACKGROUND OF THE INVENTION

1. Field of the Invention

This invention relates to reciprocating engines having crankshaft, connecting rods and piston rod units.

2. Description of the Prior Art

FR814987 and FR828306 disclose engines in which combustion take place at both sides of the piston. The difficulty of piston cooling, the lubricant loss and the bulk are some of the disadvantages of these engines.

Further disadvantage that renders them inferior to conventional engines is the restriction on the valve size and the valve location that the existence of the piston rod imposes. Taking into consideration that in the contemporary conventional engines the disadvantages of the L-head, F-head and T-head engines from the combustion chamber point of view, have rendered them obsolete, one can conclude that, whatever obliges the valve size or location to be restricted more than they are restricted in the conventional over-head valve engine, renders the engine inferior to the respective conventional engine due to the overwhelming effectiveness of the valve size and location over all the rest characteristics of a contemporary poppet valve engine. There is not substitute for the volumetric efficiency.

In double action pistons, the necessary cross section moment of inertia of the piston rod is given by the column loading theory to be $J=(4/a\pi^2)P_c l^2/E$, which for round rod yields:

$$d^4 b P_c l^2 / E \qquad (1)$$

where b depends on the type of rod supporting; being for cantilever rod b=1.

According (1), the diameter of a round rod d is proportional to the root of its length l and inversely proportional to the fourth root of the modules of elasticity of the material and independent on the strength of the material. Actually the situation is worse, because it is the combined length of piston rod and connecting rod under column loading, at least on the crankshaft-cylinder axis plane.

Thus, any development in materials will be of no value for d and materials of low E, like Titanium alloys are of no utility, despite their high strength/weight ratio that makes them attractive for moving engine parts.

U.S. Pat. No. 5,167,208 shows an engine in which combustion takes place exclusively on that side of the piston facing the crankshaft. This engine, however uses a relatively large diameter piston rod which would limit the space available for the valves and thus limits the possible intake and exhaust gas flow. Here, it is the strong bending moment on the piston rod that imposes a rod of several times thicker than what is capable to cope with the axial forces alone.

Further disadvantage of the double acting piston is the dissimilarity of the two types of cylinders and combustion chambers that are formed at the two faces of the piston. They are not only geometrically different but they also have a considerable difference in the time available to each of them for the completion of its combustion, because the piston motion of a crank-connecting rod mechanism around top dead center is faster, by a factor (1+S/2L) times, than its motion around the bottom dead center, where S is the stroke and L is the connecting rod effective length. For instance, for L=2S the dwell at bottom dead center is 1.25 times longer than the dwell at the top dead center, namely the time available to the combustion chamber formed at the closer to the crankshaft end of the cylinder, to complete its combustion is 1.25 times more than the time available to the chamber formed at the remote from the crankshaft end of the cylinder and it may give a magnitude of the likely difference in efficiency and performance between the two sets of the different kind of chambers of the double action piston engine. Contemporary practice trends show that not only for diesel engines but also for spark ignition engines this difference, in the available time, is likely to have a considerable effect in their efficiencies and performances.

SUMMARY OF THE INVENTION

Accordingly is an object of this invention to provide an engine with as compact combustion chamber as in the conventional engine, with valves not restricted by the piston rod neither with respect their size nor with respect their location, because the characteristic that makes the conventional reciprocating engine dominant over any other type of heat engine is, except its simplicity, the compactness of its combustion chamber which is combined with acceptable gas flow efficiency owing to the large over-head poppet valves able to be positioned on the cylinder head.

It is a further object of the invention to provide an engine consisting of identical cylinders, not only with regard to their geometry but also with regard to the time available for the completion of the combustion.

It is a further object of the invention to provide an engine where the combustion is given plenty of time to finish, because the ignition lag, particularly in diesel engines, and the relatively insufficient flame speed cause a lack of time for the efficient completion of the combustion in the conventional engine, hence the slower piston motion during combustion, than in conventional engine, increases the efficiency. To meet this object, this invention has available for its own combustion (1+S/2L) times the time that the conventional engine has available for its combustion.

It is still an object of this invention to provide an engine with lubrication and cooling, at least, as efficient and easy as in the conventional engine.

It is still an object of the invention to provide an engine with less bulk and weight than the conventional engine.

It is still an object of the invention to provide an engine where the connections of its body, if any, are not under gas pressure, by avoiding any considerable gas pressure, which is pushing the engine body parts apart.

In accordance with the above and further objects of the invention the piston has one face which is closer to the connecting rod pin than its other face and reciprocates into a cylinder which, has one end which is closer to the crankshaft than the other end. At the closer to the crankshaft end of the cylinder is secured a airtight cover, so that an airtight chamber is formed between the face of the piston which is the closer to the connecting rod pin and the cover of the cylinder end which is the end the closer to the crankshaft. No airtight cover exist on the other end of the cylinder, that is, no pressure is acting on the remote, from the connecting rod pin, piston face, so no considerable column loading is acting on the primary connecting rod. Thus, along the rod there is simply a tension force, due to the pressure of the gas acting on the closer to the connecting rod pin piston face. In such a simple tension of an oblong rod the necessary diameter is only $$d=(4P/\pi t)^{1/2} \qquad (2)$$

that is, the diameter d of the rod is proportional to the root of the load and inversely proportional to the root of the fatigue strength t of the material, in, substantially, positive tension.

For reasonable strength of the materials likely to be used for the piston rod manufacturing and for reasonable dimensions of bore and stroke and for reasonable maximum pressure of the thermodynamic cycle the equation (2) yields diameters of rod in the range of 10% of the bore and even smaller, which, evidently, impose no restriction on the valve size or location, in a multivalve engine, and only little restriction in a two valve engine. Furthermore, any further development in the fatigue strength t, of the materials will reduce d, which will further contributes in the reduction of the chamber wall area, of the rod seals length and in lighter moving parts improving mechanical efficiency.

DESCRIPTION OF THE DRAWINGS

In FIGS. 1 and 2, there are shown two sectioned views of the invention, one normal to crankshaft 4 and one on the crankshaft-cylinder 3 axis plane.

Figure 4:
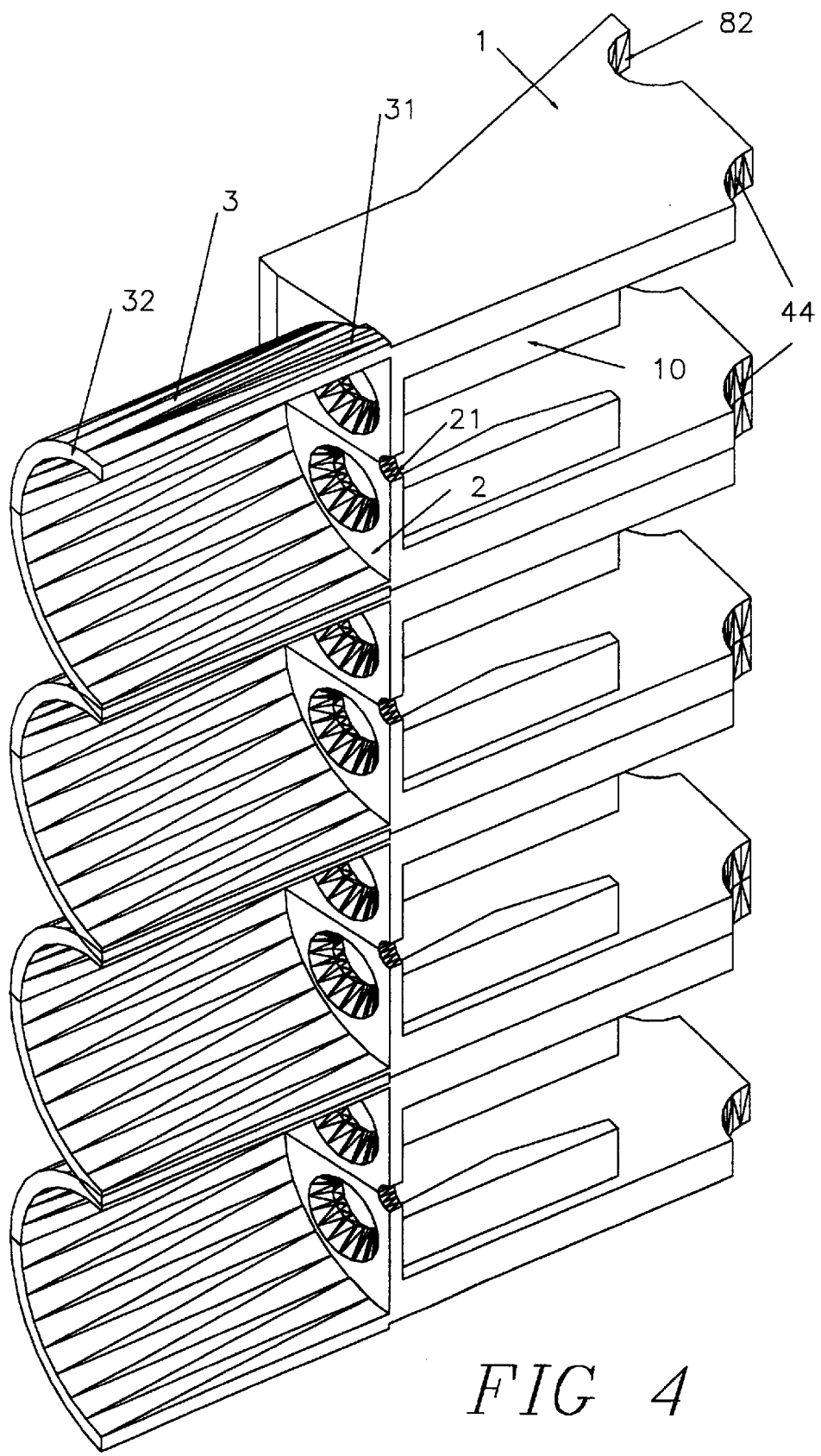
Figure 7:
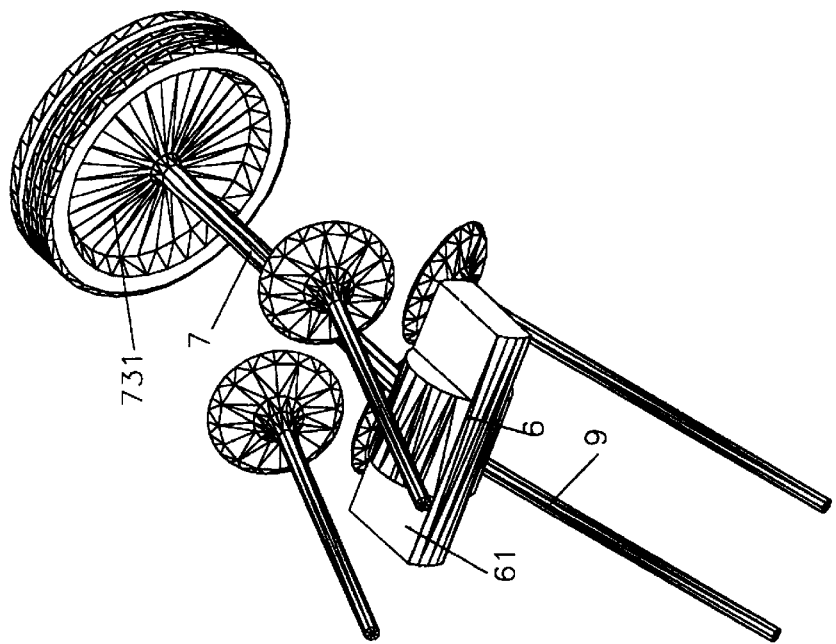
Figure 6:
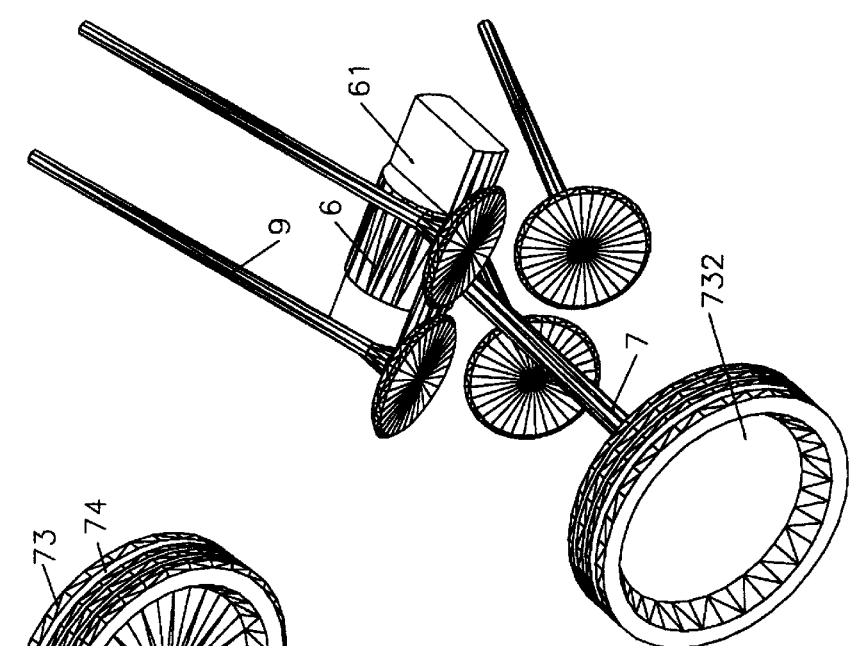
Figure 5:
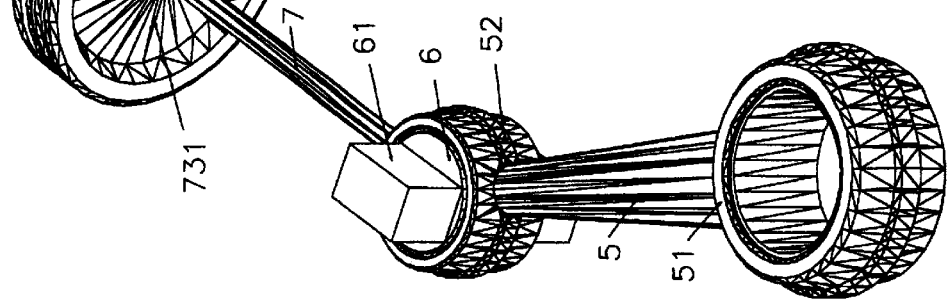

To connecting rod pin 6, which is better shown in FIGS. 5, 6 and 7 is secured the one end of the primary connecting rod 7 and is also articulated the small end 52 of the secondary connecting rod 5. The opposite end of the primary connecting rod 7 is secured to piston 73 while the big end of the secondary connecting rod 5 is articulated to crank pin 41 of the crankshaft 4. On the slideways 10 better shown in FIG. 4, are sliding the connecting rod pin sliders 61 better shown in FIGS. 5,6, and 7.

The end 32 of the cylinder 3, better shown in FIG. 4, which is the distant from the crankshaft 4 end of the cylinder 3 is referred to as the distant, from the crankshaft, cylinder end 32, while the end 31 of the cylinder 3 which is the near to crankshaft 4 cylinder end is referred to as the near, to crankshaft, cylinder end 31.

Respectively, the surface of the piston which is nearer to connecting rod pin 6 is referred to as the near, to connecting rod pin, piston face 731, better shown in FIGS. 5,6,7 and 8, while the piston surface 732 which is the distant from the connecting rod pin, piston face is referred to as the distant, to connecting rod pin, piston face 732. The plate 2, better shown in FIG. 4, has the aperture 21, where the primary connecting rod 7 is passing through and the ports for the valves 9. The gear 45 secured on the crankshaft 4 drives the gears 81 of the camshafts 8.

The foregoing description points out that in this engine only one airtight chamber is formed which is the room among the near, to connecting rod pin, piston face 731, the plate 2 and the surface of the bore. It also points out that no pressure can exist on the distant to connecting rod pin piston face 732. Thus, the primary connecting rod 7 is free from compressive force, other than what the inertia of the piston 73 applies, which is several times smaller, even at high speed, than the tension load applied on it due to the gas pressure on the piston face 731. As known, the maximum compressive inertia force is about 0.6 times the maximum tension inertia force for usual lengths of the connecting rod.

Figure 2:
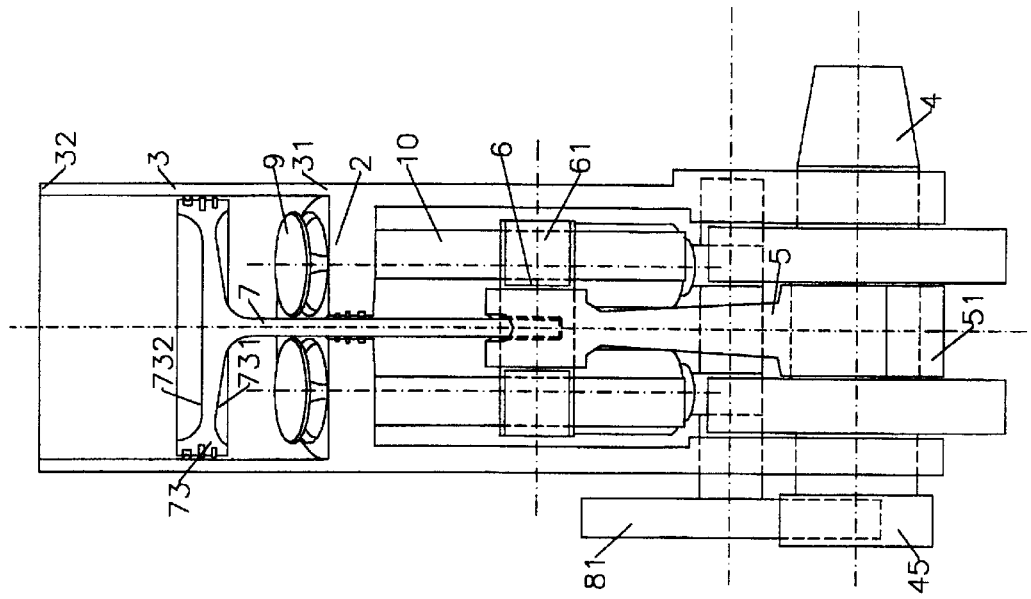
In FIGS. 1 to 8, it is shown how the elimination of the, theoretically, inferior set of cylinders of the double action piston engine, is realized so that, what is left is an engine consisting only of the, theoretically, more efficient set of cylinders.
Figure 1:
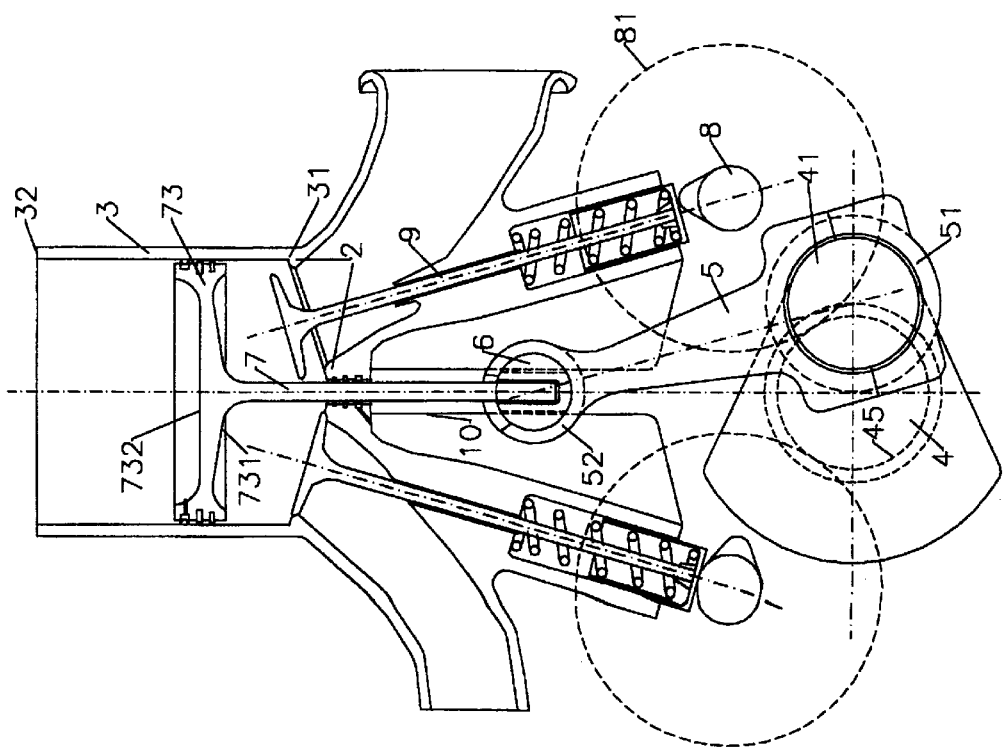
Figure 3:
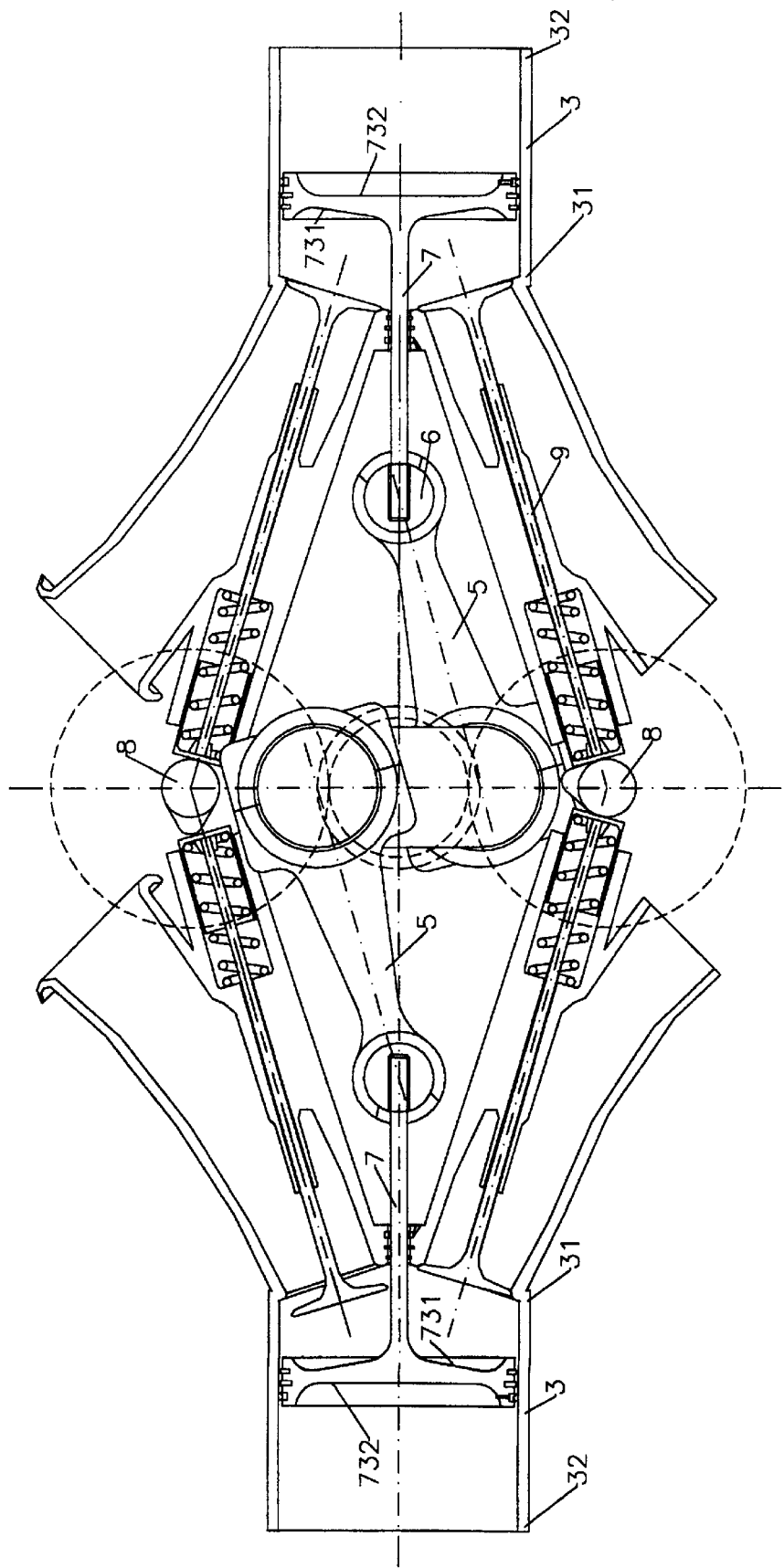

In FIG. 3 it is shown an embodiment of a boxer engine utilizing common camshafts for the two banks.

In FIG. 4 they are shown the crankshaft main bearings 44, the camshaft bearings 82, the slideways 10 and the plates 2 on the casing of a four cylinder engine.

In FIG. 5 it is shown a perspective view of the parts of the motion translating mechanism and the sole piston face 731 where gas pressure is applied.

In FIG. 7 it is shown the face 731 of the piston, with respect to the valves 9 position, to show the space between the valves 9 and the piston face 731 where exclusively the combustion happens, while in FIG. 6 it is shown the piston face 732, on which no combustion takes place.

Figure 8:
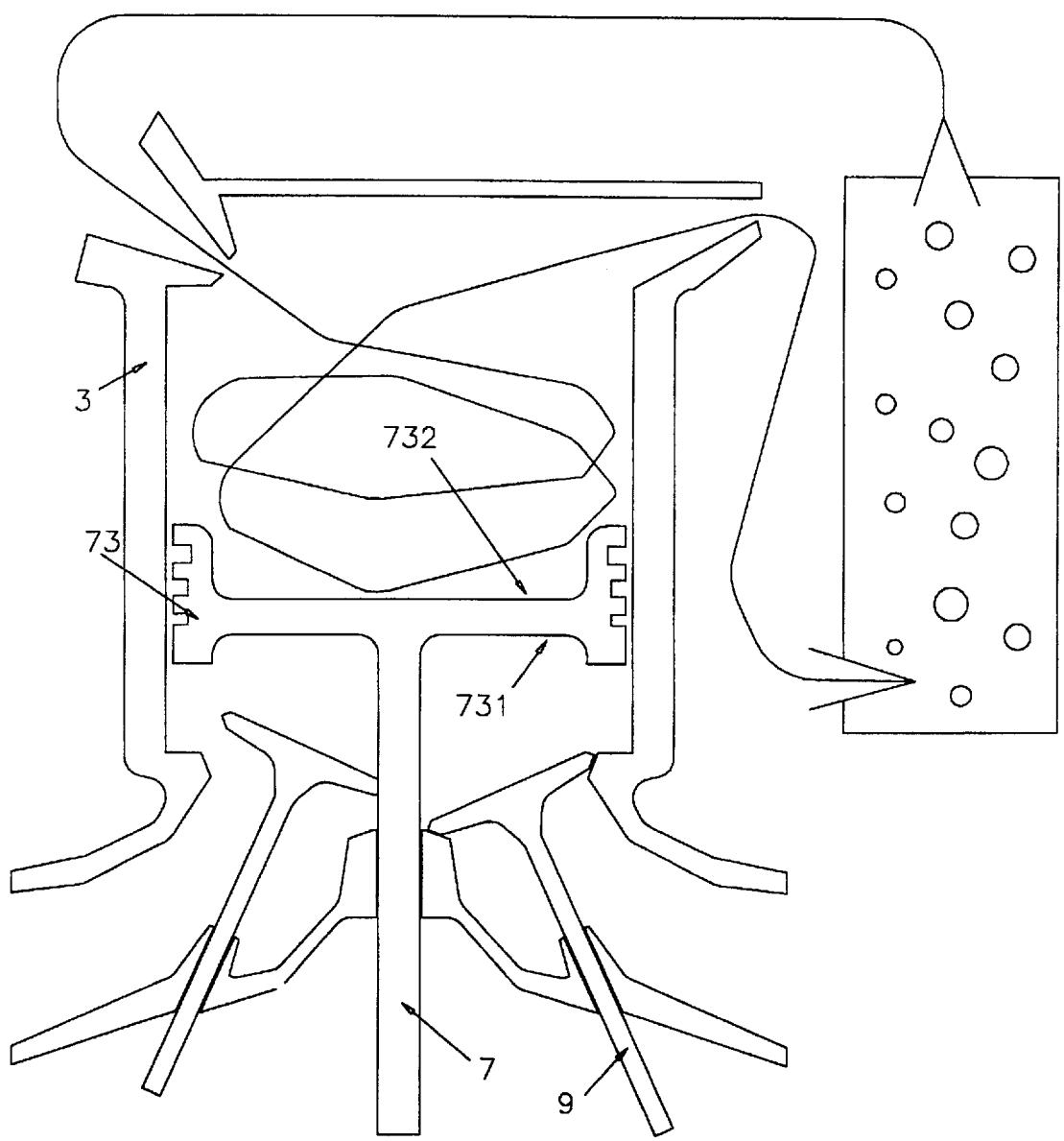

In FIG. 8 it is shown a piping for a cooling fluid flow which is driven by the piston motion and cools the cylinder bore from within and the distant, from the connecting rod pin, piston face 732. Appears likely, that some of the restrictions imposed on the cylinder wall temperature are due to the oil film endurance limit in temperature. This coolant flow, directly towards the inner wall of the cylinder, may maintain the oil film cooler in spite of a hotter wall, by comparison to conventional engine, aiming to reduce heat loss.

What is claimed is:

1. A reciprocating piston internal combustion engine comprising:

a casing;

a crankshaft;

a cylinder having a piston reciprocable therein;

said cylinder having a cylinder end near to said crankshaft and a cylinder end distant from said crankshaft;

a plate being secured to said cylinder end near to said crankshaft;

a connecting rod pin;

a primary connecting rod sealingly passing through an orifice in said plate and being secured at one end to said piston and at the opposite end to said connecting rod pin;

a secondary connecting rod articulated at one end to said crankshaft and at the opposite end to said connecting rod pin;

said piston having a piston face near to said connecting rod pin and a piston face distant from said connecting rod pin;

whereby combustion occurs exclusively in the chamber formed between said piston face near to said connecting rod pin and said plate;

characterized in that, the connecting rod pin also comprises slider means, sliding on slideways secured to said casing;

the end of said cylinder distant from said crankshaft is not pressurised, whereby the diameter of the primary connecting rod is kept to a minimum and;

said plate includes valves which do not extend substantially outwardly from the cylinder bore projection on said plate.

2. A reciprocating piston internal combustion engine according to claim 1 wherein said end of said cylinder distant from said crankshaft is adapted as an aperture means to direct cooling fluid towards the inside wall of said cylinder and towards said piston face distant from said connecting rod pin.

3. A reciprocating piston internal combustion engine according to claim 1 wherein said casing includes at least one camshaft comprising counterweights webs balancing the first order inertia forces and the first order inertia moments of a two stroke cycle engine.

* * * * *